(12) United States Patent
Goodsell et al.

(10) Patent No.: US 9,035,121 B1
(45) Date of Patent: May 19, 2015

(54) METHOD AND APPARATUS FOR HOME MEDICATION DISPOSAL

(76) Inventors: Scott S. Goodsell, Orange Beach, AL (US); Robert P. Goodsell, Woodstock, GA (US)

( * ) Notice: Subject to any disclaimer, the term of this patent is extended or adjusted under 35 U.S.C. 154(b) by 380 days.

(21) Appl. No.: 13/447,401

(22) Filed: Apr. 16, 2012

Related U.S. Application Data

(60) Provisional application No. 61/614,560, filed on Mar. 23, 2012.

(51) Int. Cl.
*A62D 3/30* (2007.01)
*B09B 3/00* (2006.01)

(52) U.S. Cl.
CPC .................... *B09B 3/0075* (2013.01)

(58) Field of Classification Search
CPC .................................................... B09B 3/0075
USPC ............. 588/249.5, 259, 300, 313, 316, 400;
53/431, 433, 434, 467–469; 206/366;
220/908; 383/210, 210.1, 211, 59, 63,
383/84, 85, 87; 424/449, 484, 485, 760
See application file for complete search history.

(56) References Cited

U.S. PATENT DOCUMENTS

| | | | | |
|---|---|---|---|---|
| 5,048,692 | A * | 9/1991 | Handler et al. | 383/85 |
| 5,148,940 | A * | 9/1992 | Mendise | 220/908 |
| 6,821,018 | B1 * | 11/2004 | Denko | 383/84 |
| 2009/0131732 | A1 | 5/2009 | Day | |
| 2009/0180936 | A1 * | 7/2009 | Anderson et al. | 422/129 |
| 2010/0041937 | A1 * | 2/2010 | Gonzalez | 588/321 |
| 2010/0076244 | A1 | 3/2010 | Parrott | |
| 2010/0258565 | A1 | 10/2010 | Isaacson et al. | |
| 2011/0215021 | A1 | 9/2011 | Ziemba | |
| 2013/0085313 | A1 * | 4/2013 | Fowler et al. | 588/249.5 |
| 2014/0187842 | A1 * | 7/2014 | Holaday et al. | 588/313 |

* cited by examiner

*Primary Examiner* — Luan K Bui
(74) *Attorney, Agent, or Firm* — George L Williamson

(57) ABSTRACT

Method and apparatus for disposal of used home medication which comprises an outer container being sealable and disposable containing an inner water-soluble packet/bag of gelling agent and coloring agent for stabilizing the used medication wherein the outer container comprises a foil-type container having a double sealing mechanism including a first zip lock sealing portion and a second self-sticking sealing portion to insure that the contents are safely sealed prior to disposal in a conventional home solid waste disposal unit.

5 Claims, 3 Drawing Sheets

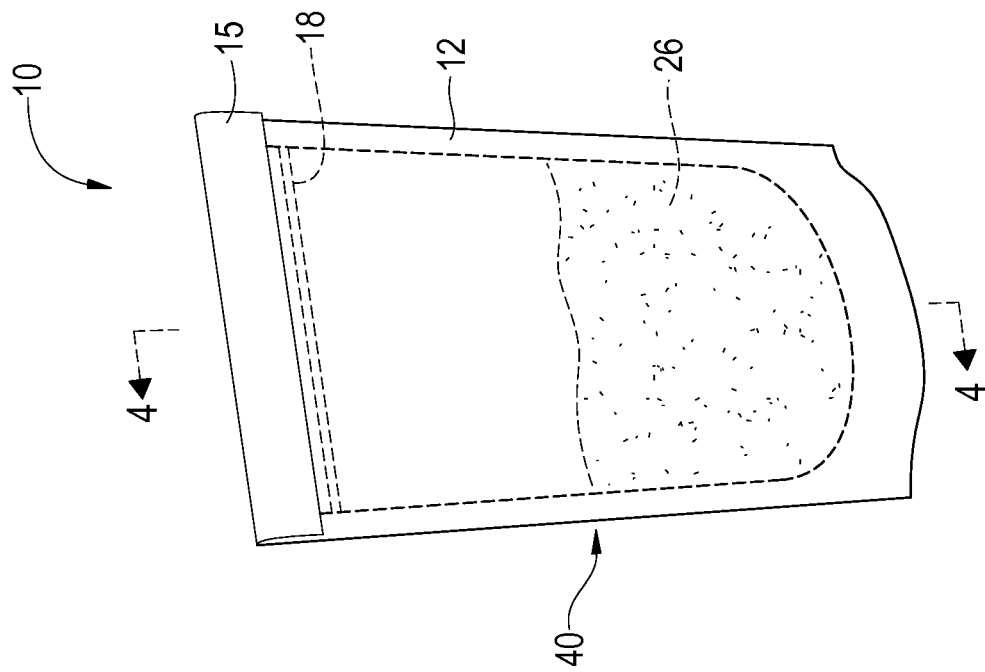
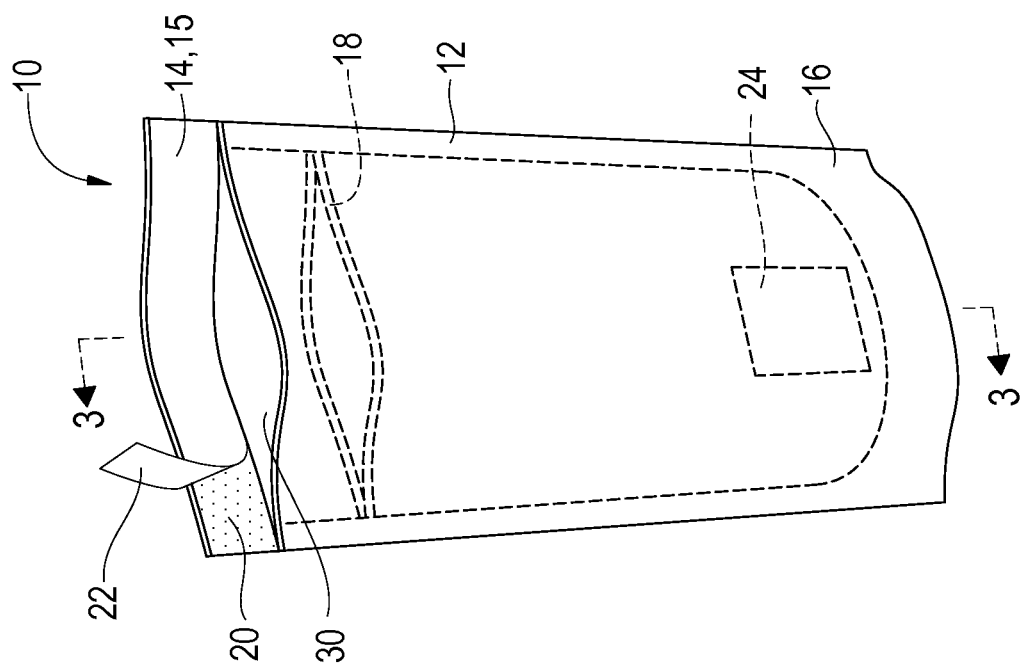

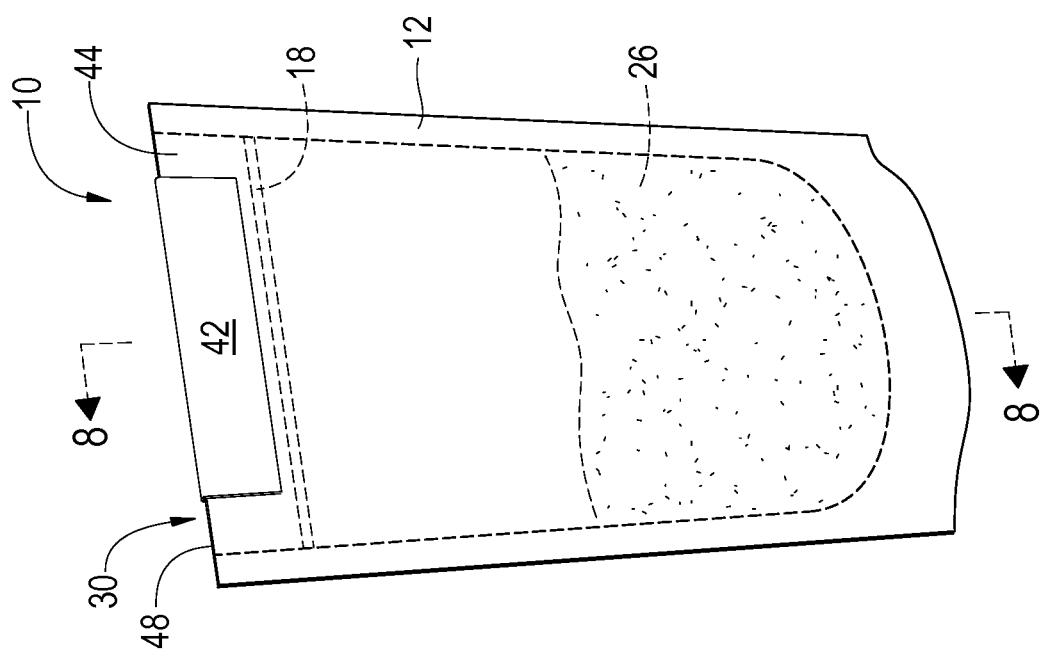
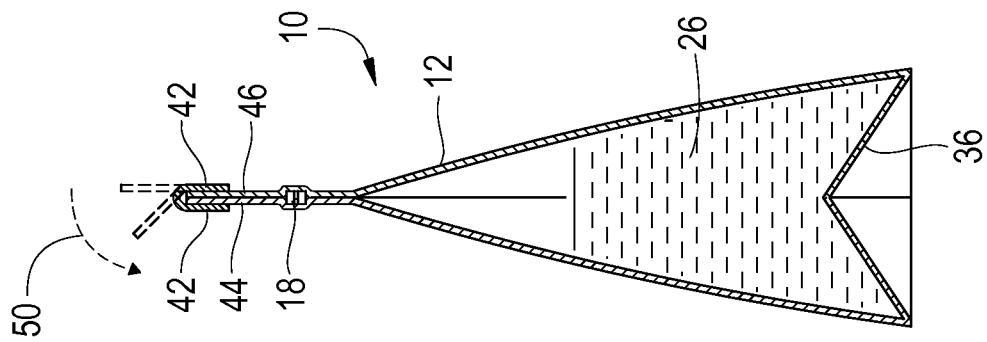

METHOD AND APPARATUS FOR HOME MEDICATION DISPOSAL

RELATED APPLICATION

This application claims benefit of U.S. Provisional Application Ser. No. 61/614,560 filed on Mar. 23, 2012.

BACKGROUND OF THE INVENTION

Field of the Invention

The present invention relates generally to waste disposal and, more particularly, is concerned with a method and apparatus for disposal of used home medication.

Unused and expired medications, including narcotics in solid pill form, liquids or patches, present a disposal problem from both safety and environmental viewpoints. Consumers and medical professionals utilize a wide variety of methods to dispose of medications no longer needed ranging from flushing them down the toilet, to mixing them with kitty litter and throwing them in the trash, to taking them to community centers for disposal.

Conventional methods of assuring convenient, environmentally-friendly disposal of such medications, which merely comprise various containers and mixtures involving additives for the purpose of ensuring that the medications were no longer palatable for human consumption and that they did not enter the water system, are no longer acceptable. While these methods are somewhat effective, they lack certain components needed by the clinical professional working in the patient home. Furthermore, they allow for the user to be exposed to the additives, and they typically allow for unintended subsequent access once medications have been mixed in the container, and they lack certain properties to make them fully unpalatable to a person who would intentionally access the resulting mixture. Also, conventional disposal methods do not address the comprehensive medication disposal system needs of the clinical professional caring for patients in the home as does the present invention.

DESCRIPTION OF THE RELATED ART

Home medication disposal systems have been described in the related art, however, none of the related art devices disclose the unique features of the present invention.

In U.S. Patent Application Publication No. 2009/0180936 dated Jul. 16, 2009, Anderson, et al., disclosed a medication disposal system. In U.S. Patent Application Publication No. 2010/0041937 dated Feb. 18, 2010, Gonzales disclosed an apparatus and method for safely disposing of medicines. In U.S. Patent Application Publication No. 2009/0131732 dated May 21, 2009, Day disclosed a composition for disposing of unused medicines. In U.S. Patent Application Publication No. 2010/0258565 dated Oct. 14, 2010, Isaacson, et al., disclosed devices and methods for disposing of medications. In U.S. Patent Application Publication No. 2011/0215021 dated Sep. 8, 2011, Ziemba disclosed a container and method for facilitating disposal of unused pharmaceutical products. In U.S. Patent Application Publication No. 2010/0076244 dated Mar. 25, 2010, Parrott disclosed a pill catcher. While these medication disposal systems may be suitable for the purposes for which they were designed, they would not be as suitable for the purposes of the present invention as hereinafter described.

SUMMARY OF THE PRESENT INVENTION

The present invention discloses a method and apparatus for disposal of home medication which comprises an outer container or pouch being sealable and disposable containing an inner packet/bag of gelling agent and coloring agent wherein the outer pouch comprises a foil-type container having a double sealing mechanism including a zip lock portion and taped portion to insure that the contents are safely sealed prior to disposal in a conventional home solid waste disposal unit. The outer pouch, is a foil-type unit having a protective strip covering an adhesive portion on its upper end so that when the adhesive portion is folded over and sealed back upon itself, the adhesive portion insures that the zip lock portion is also safely and correctly closed. In an alternative embodiment, the outer pouch is secured by folding a separate adhesive strip over the top and both sides of the closed pouch opening to insure that the zip lock portion is properly closed. The inner packet/bag is dissolvable and contains a gelling agent in order to stabilize the medication along with a coloring agent to make the resulting waste product look radically undesirable to ensure that the user does not accidentally consume the used medication.

An object of the present invention is to provide an outer safety package for containment of home medications for disposal in a conventional solid waste disposal unit. A further object of the present invention is to provide an inner packet/bag for placement inside the outer foil unit that will stabilize the used medication and also to color the resulting used medication waste product so that it is not unintentionally consumed by a user. A further object of the present invention is to provide a method of identifying and tracking the waste material to assure that the waste material is properly handled and disposed of by the user. A further object of the present invention is to provide a home medication disposal unit which is easily operated by a user in compliance with all appropriate regulations. A further object of the present invention is to provide a home medication disposal system which can be easily and relatively inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 1 is a perspective view of the present invention showing the outer pouch in an open configuration.

FIG. 2 is a perspective view of the present invention showing the outer pouch in a closed configuration.

FIG. 7 is a perspective view of an alternative embodiment of the present invention showing the outer pouch in a closed configuration.

FIG. 8 is a cross sectional view taken from FIG. 7 as indicated.

LIST OF REFERENCE NUMERALS

Figure 3:
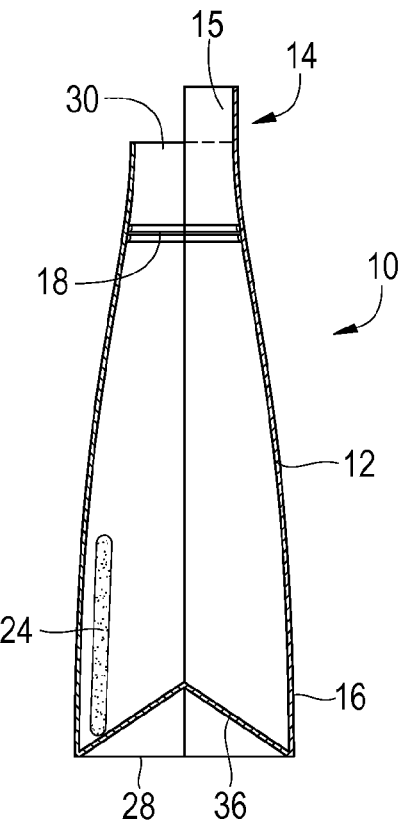
FIG. 3 is a cross sectional view taken from FIG. 1 as indicated.

With regard to reference numerals used, the following numbering is used throughout the drawings.
10 present invention
12 outer pouch
14 upper portion
15 flap of outer pouch
16 lower portion
18 zip lock strip
20 adhesive strip
22 protective tear away strip
24 inner packet/bag
26 liquid
28 base
30 mouth
32 used medication container
34 used medication
36 bottom
38 support surface
40 approximate safe fill level
42 adhesive security strip
44 front surface
46 rear surface
48 upper edge
50 arrow

DETAILED DESCRIPTION OF THE PREFERRED EMBODIMENT(S)

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 8 illustrate the present invention wherein a method and apparatus for home medication disposal is disclosed.

Figure 6:
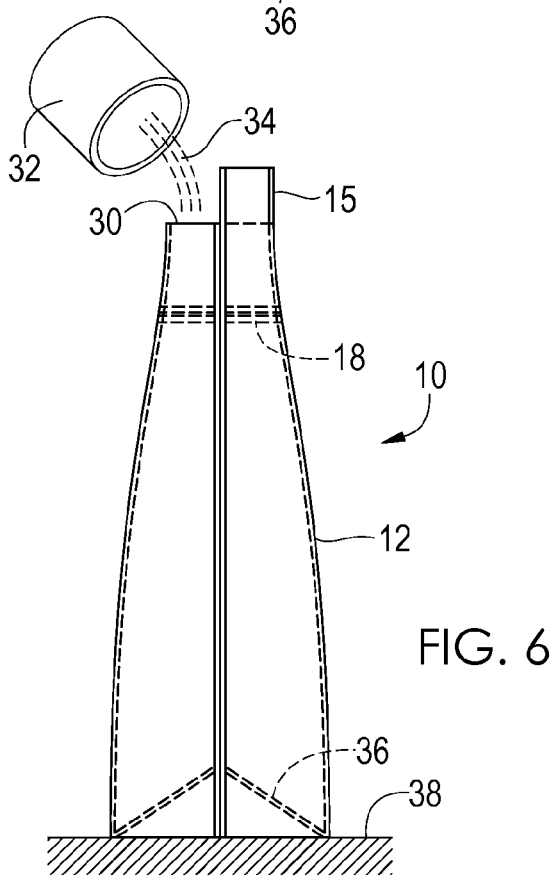
FIG. 6 is side view of the present invention showing the outer pouch in an open configuration.

Turning to FIG. 1, therein is shown the present invention 10 comprising an aluminum foil-coated, or the like, outer container or pouch 12 having an upper end portion 14 and lower end portion 16 wherein the lower portion can be expanded so that the pouch can be self-supporting in an upright standing position as best shown in FIG. 6. Also shown is a zip closure or zip lock strip 18 portion, which is a first or primary sealing means, having interlocking ridges and groove that forms a water-tight seal when pressed together which is placed near the upper portion 14 of the outer pouch 12 for sealing the pouch in an environmentally and aesthetically acceptable manner. Also shown at the upper end portion 14 of the pouch 12 is a flap 15 having an adhesive strip portion 20 thereon, which is a second or secondary sealing means, having a removable or peel-off protective strip 22 so that when the protective strip is removed the underlying self-sticking adhesive area is exposed and can then be used to assist in closing and covering the mouth 30 of the pouch. Also shown inside the outer pouch 12 is a dissolvable inner bag or packet 24 which contains a gelling agent and a coloring agent wherein the gelling agent stabilizes the used medication and the coloring agent dyes the used medication so that the used medication cannot be unintentionally consumed by a user. Packet 24 is dissolvable and allows for containment of the additive and prevents exposure and spillage of its contents until water is added. Also, packet 24 may contain a taste deterrent additive as well to further ensure no unintended consumption of the waste material. Packet 24 is made of lightweight, dissolvable paper-like material.

Turning to FIG. 2, therein is shown the present invention 10 wherein the outer pouch 12 has been sealed by sealing both the zip lock strip 18 and by folding over the flap 15 and adhesive portion 20 back down upon the outer surface of the upper portion of the outer pouch 20 so that the mouth 30 is sealed wherein the protective strip 22 can then be thrown away. Also shown internal the pouch 12 is a liquid, e.g., water 26 which has been poured into the pouch 12 up to an approximate safe fill level 40 so that the used medication can be placed inside the pouch 12 and stabilized and colored by the dissolvable inner packet 24. The inner packet 24 is not visible because it has now been dissolved in the liquid mixture 26 so that the inner packet is no longer visible.

Figure 4:
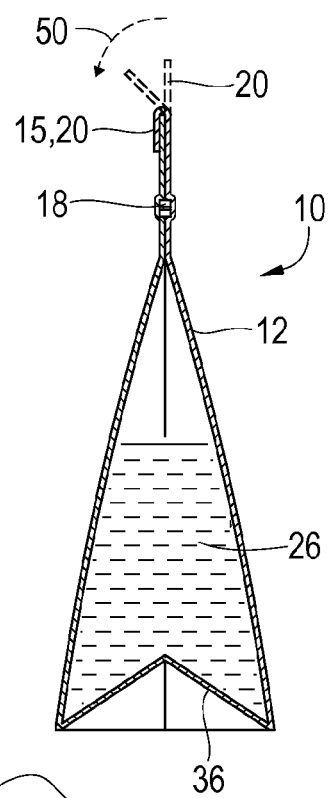
FIG. 4 is a cross sectional view taken from FIG. 2 as indicated.

Turning to FIGS. 3 and 4, therein are shown cross sectional views of the present invention taken from FIG. 1 and FIG. 2 as previously described. FIG. 3 shows the present invention 10 wherein the outer pouch 12 has its lower portion 16 expanded to expose the bottom layer 36 so as to form a base 28 wherein the outer pouch 12 can be upstanding and self-supporting so that a user does not have to use his/her hands to hold the pouch in an upright position; also, the upper portion 14 and flap 15 are shown along with the mouth 30 of the pouch being open and ready to receive the used medication. Inner bag or packet 24 is also shown. FIG. 4 shows the liquid or gel mixture 26 inside the outer pouch 12 and also shows the zip lock strip 18 sealed and the adhesive strip 20 on flap 15 being turned over and folded down upon the outer pouch, as indicated by arrow 50, so as to assure that the mouth 30 of the outer pouch is properly sealed.

Figure 5:
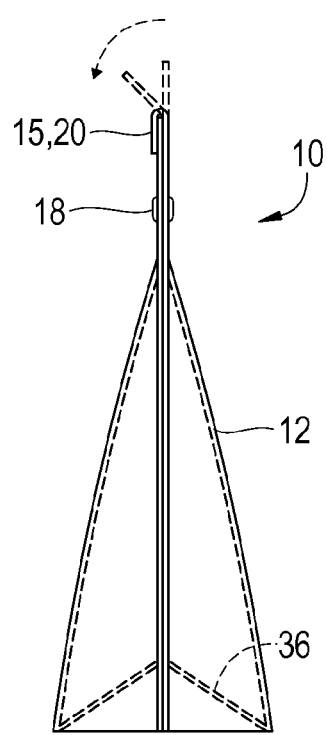
FIG. 5 is a side view of the present invention.

Turning to FIG. 5, therein is shown a side view of the present invention 10 showing the outer pouch 12 and disclosing other features which have been previously described.

Turning to FIG. 6, therein is shown a used medication container 32 being used to pour used medication 34 into the mouth 30 of the outer pouch 12 being free-standing on surface 38. Other previously disclosed elements are also shown.

Turning to FIG. 7, therein is shown an alternative embodiment of the secondary sealing means of the present invention 10 wherein the outer pouch 12 has been sealed by sealing both the zip lock strip 18 and by securing the mouth 30 of the outer pouch 12 by application of a separate self-sticking adhesive security strip 42 which strip is folded over both front and rear surfaces 44, 46 (not shown see FIG. 8) of the upper edge 48 of the pouch so that the mouth 30 is sealed. Also shown internal the pouch 12 is a liquid, e.g., water 26 which has been poured into the pouch 12 up to an approximate safe fill level so that the used medication can be placed inside the pouch 12 and stabilized and colored by the dissolvable inner packet 24 (not shown see FIG. 1). The inner packet is not visible because it has now been dissolved in the liquid mixture 26 so that the inner packet is no longer visible.

Turning to FIG. 8, therein are shown cross sectional view of an alternative embodiment of the present invention taken from FIG. 7 as indicated. Therein is shown the liquid or gel mixture 26 inside the outer pouch 12 and also shows the zip lock strip 18 sealed and the separate adhesive security strip 42 being folded over both front 44 and rear 46 surfaces of the upper edge (not easily visible, see FIG. 7) of the pouch so as to assure that the mouth 30 (not shown see FIG. 7) of the outer pouch is properly sealed. The self-sticking adhesive security strip 42 is shown by arrow 50 being folded from the rear surface 46 to the front surface 44 of the upper edge (not easily visible, see FIG. 7) of pouch 12.

A further description of the operation and use of the present invention 10 follows and makes reference to FIGS. 1-8. 1) Medication disposal: Carefully open large outer pouch 12 to remove and briefly set aside small packet/bag 24 on dry surface. Push hand into pouch 12 to expand base 28, 36 so pouch will stand on its own. Pour up to one cup medications 34 into pouch 12. Add no more than 1½ cups warm water 26 into pouch 12 up to the approximate safe fill level 40. Drop small packet/bag 24 back into pouch 12 and observe bag and contents 24, 26, 34 begin to change in consistency and color as packet 24 dissolves. Securely close the zip fastener 18 and do one of the following depending on which embodiment is being used: a) utilize adhesive strip 20 on top flap 15 by removing tape backing 22 above zip fastener and then folding pouch flap over and down while pressing firmly to permanently seal pouch, or, b) apply adhesive security strip 42 to the top edge 48 of the pouch. Shake pouch 12 gently for at least 10 seconds to mix contents as they gel, then immediately discard into household trash. 2) Medication Waste and Destruction Log: Complete top section of form with basic information. Fill in details for each drug inventoried for destruction. Sign and have witness initial where indicated for drugs destroyed. Include in patient file. 3) Prescription Cover-Up Labels: Use cover-up labels provided to place over empty prescription bottles 32 before safely discarding them in trash.

The contents of the inner packet/bag 24 comprise a granular superabsorbent polymer (SAP) and a powdered or granular dye. Superabsorbent polymers are prepared from acrylic acid and a crosslinker by solution or suspension polymerization. The packet 24 may also include a bittering agent which helps to further limit the risk of unintended or intended consumption. Examples of bittering agents for this purpose include ground cayenne or jalapeno peppers.

The inner packet/bag 24 is made of water-soluble, earth-friendly, non-toxic material that dissolves instantly in water, or can biodegrade gradually depending on the amount of water or moisture exposure. The material is composed of Sodium Caboxy Methyl Cellulose and wood pulp from FSC certified forests. This dissolving material has a paper-like consistency that can vary in thickness and can also be enhanced with custom coatings.

We claim:

1. A method for disposing of used medication, comprising the steps of:
  a) providing a container having upper end and lower end portions, left and right side portions, and front and rear wall surfaces, a bottom layer on the lower end portion, the container having an opening on the upper end portion, the container having an internal space and an outer surface;
  b) providing a first seal proximate the upper end portion of the container to substantially seal the opening of the container, said first seal comprising a zip lock strip spaced from said upper end of said container;
  c) providing a second seal on the upper end portion of the container to assure complete closure of the opening of the container, said second seal comprising said rear wall surface extending above said front wall surface forming a foldable flap with a sealing adhesive thereon so that when folded over said front wall surface, said folded flap being completely located above said zip lock strip;
  d) expanding the bottom layer to form a base for supporting the container in an upright position to permit an unassisted user to insert the used medication into the container and removing and setting aside a packet contained within said container;
  e) pouring said used medication into said container;
  f) adding warm water to said container;
  g) inserting back into said container said packet, said packet containing a chemical agent, said packet being made of lightweight, paper-like material which dissolves instantly in water, and said chemical agent including a super-absorbent material and a taste deterrent additive comprising a bittering agent;
  h) sealing the container using the first and second; and
  i) mixing the chemical agent, the used medication and the warm water within the container so as to stabilize the used medication.

2. The method of claim 1, wherein said deterrent additive includes a coloring agent so that the used medication cannot be unintentionally consumed by a user.

3. The method of claim 2, wherein the packet is composed of sodium caboxy methyl cellulose and wood pulp having a paper-like consistency.

4. The method of claim 3, wherein the super-absorbent material is a polymer.

5. The method of claim 4, wherein the bittering agent is selected from the group consisting of ground cayenne and jalapeno peppers.

* * * * *